United States Patent
Gorny et al.

(10) Patent No.: US 11,038,830 B2
(45) Date of Patent: Jun. 15, 2021

(54) CREATING AND SHARING CUSTOMIZABLE CHAT SPACES

(71) Applicant: Nextiva, Inc., Scottsdale, AZ (US)

(72) Inventors: Tomas Gorny, Scottsdale, AZ (US); Jean-Baptiste Martinoli, St Anaclet de Lesard (CA); Tracy Conrad, Scottsdale, AZ (US); Lukas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 0 days.

(21) Appl. No.: 16/857,591

(22) Filed: Apr. 24, 2020

(65) Prior Publication Data
US 2020/0412677 A1 Dec. 31, 2020

Related U.S. Application Data

(60) Provisional application No. 62/868,734, filed on Jun. 28, 2019.

(51) Int. Cl.
*G06F 3/0482* (2013.01)
*H04L 12/58* (2006.01)
*G06F 3/0484* (2013.01)

(52) U.S. Cl.
CPC .......... *H04L 51/22* (2013.01); *G06F 3/0482* (2013.01); *G06F 3/0484* (2013.01)

(58) Field of Classification Search
CPC ........ H04L 51/22; H04L 51/04; H04L 51/18; H04L 12/1818; G06F 3/0482; G06F 3/0484; G06F 3/048
See application file for complete search history.

(56) References Cited

U.S. PATENT DOCUMENTS

| 8,413,055 B2 | 4/2013 | Yuen et al. |
| 10,348,658 B2 | 7/2019 | Rodriguez et al. |
| 2003/0195928 A1* | 10/2003 | Kamijo ............... H04L 12/1818 709/204 |

(Continued)

OTHER PUBLICATIONS

International Search Report for Application No. PCT/US2020/037773 dated Sep. 2, 2020. 2 Pages.

*Primary Examiner* — Jeanette J Parker
(74) *Attorney, Agent, or Firm* — Spencer Fane LLP; Steven J. Laureanti (57) ABSTRACT

A system and method are disclosed for generating a customizable communication space, comprising one or more customized chat spaces, in which two or more communication devices participate. A computer coupled with a database and comprising a processor and memory generates a customizable communication space and transmits requests to join the customizable communication space to the two or more communication devices. The computer stores in memory identification information for each of the two or more communication devices. The computer configures, in response to instructions transmitted by one of the two or more communication devices, a customized chat space. The computer transmits the customized chat space to the two or more communication devices and stores in the computer memory communications transmitted by the communication devices within the customized chat space.

20 Claims, 5 Drawing Sheets

(56) References Cited

U.S. PATENT DOCUMENTS

| | | | |
|---|---|---|---|
| 2009/0248818 A1* | 10/2009 | Hara | G06Q 10/107 |
| | | | 709/206 |
| 2012/0179557 A1* | 7/2012 | Gross | G06Q 30/02 |
| | | | 705/14.73 |
| 2013/0325982 A1* | 12/2013 | Krantz | H04L 67/02 |
| | | | 709/206 |
| 2016/0112353 A1* | 4/2016 | Maehiro | A63F 13/73 |
| | | | 709/206 |
| 2019/0138182 A1* | 5/2019 | Kropivny | A63F 13/79 |
| 2021/0105149 A1* | 4/2021 | Roedel | H04L 12/1822 |

* cited by examiner

CREATING AND SHARING CUSTOMIZABLE CHAT SPACES

CROSS-REFERENCE TO RELATED APPLICATIONS

The present disclosure is related to that disclosed in the U.S. Provisional Application No. 62/868,734, filed Jun. 28, 2019, entitled "Creating and Sharing Customizable Chat Spaces." U.S. Provisional Application No. 62/868,734 is assigned to the assignee of the present application. The subject matter disclosed in U.S. Provisional Application No. 62/868,734 is hereby incorporated by reference into the present disclosure as if fully set forth herein. The present invention hereby claims priority under 35 U.S.C. § 119(e) to U.S. Provisional Application No. 62/868,734.

TECHNICAL FIELD

The present disclosure relates generally to electronic chat-based communication networks and more specifically to creating and sharing customizable chat spaces within such communication networks.

BACKGROUND

Electronic messaging systems may utilize communication networks, including but not limited to the internet, to connect communication systems and communication devices such as computers, tablet computers, and/or smartphones. Messaging systems may permit communication systems to share text-based messages, files, visual imagery, and audio data with other communication systems. However, messaging systems may not provide customizable chat system interfaces and may prevent messaging system users from incorporating and storing non-chat functionalities in chat interface templates.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to more detailed descriptions presented below.

In embodiments of the disclosed subject matter, the unique systems and methods described herein make use of an exemplary system and method to create and share customizable chat spaces. Embodiments of the disclosed subject matter include two or more communication devices, including but not limited to tablet computers or smartphones, and a computer coupled with a database and comprising a processor and memory. The computer generates a customizable communication space, comprising one or more customized chat spaces, and transmits requests to join the customizable communication space to the two or more communication devices. The computer stores in memory identification information for each of the two or more communication devices.

In embodiments of the disclosed subject matter, the computer configures, in response to instructions transmitted by one of the two or more communication devices, a customized chat space. The computer transmits the customized chat space to the two or more communication devices and stores in the computer memory communications transmitted by the communication devices within the customized chat space.

These and other features of the disclosed subject matter are described in greater detail below.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, embodiments of the following disclosure relate to creating and sharing chat spaces within chat-based communication networks. Embodiments of the following disclosure generate a communication space that includes a plurality of communication systems, each comprising one or more user communication devices. Embodiments of the communication space allow the communication systems to create one or more chat spaces within the communication space. The chat spaces may feature customizable behavior or functionality, such as calendar or current weather functionality, as described in greater detail below. Embodiments permit one or more communication systems to search for and participate in one or more chat spaces within the communication space.

Embodiments of the following disclosure allow users to create and share customizable chat spaces in one-to-one, many-to-many, and one-to-many/many-to-one communication configurations.

Figure 1:
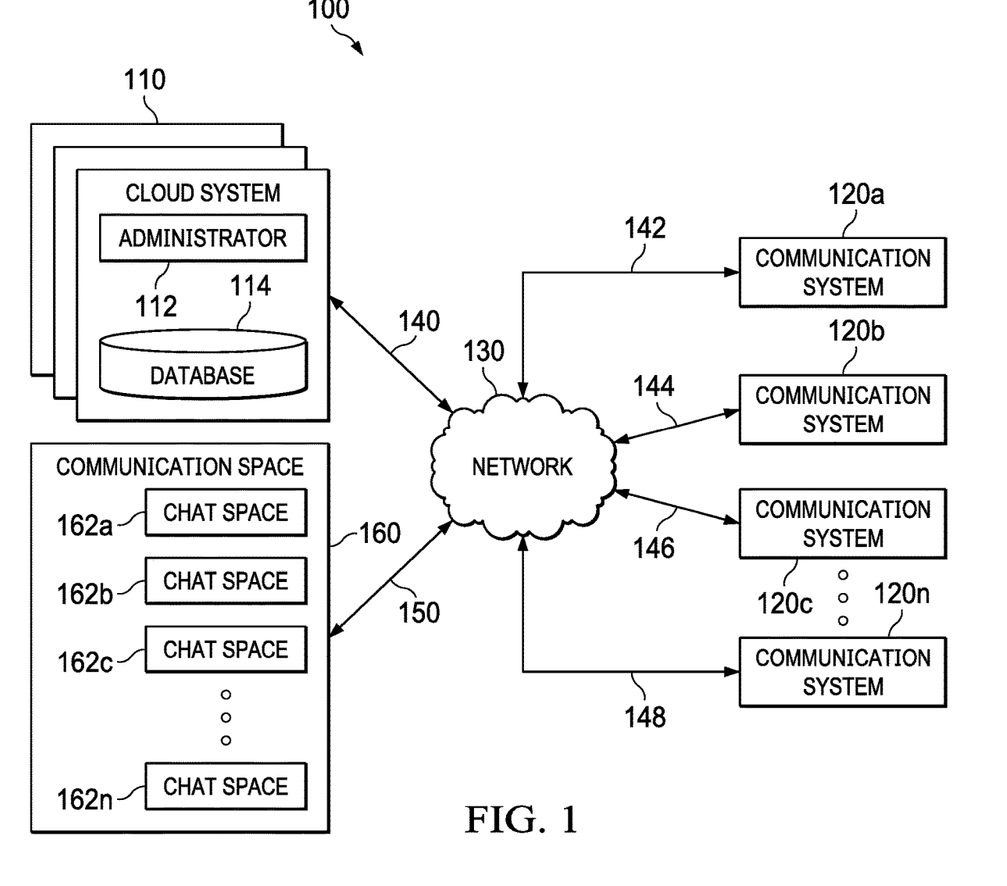
FIG. 1 illustrates an exemplary communication network, according to a first embodiment.

FIG. 1 illustrates exemplary communication network 100, according to a first embodiment. Communication network 100 comprises one or more cloud systems 110, one or more communication systems 120, network 130, communication links 140-150, and communication space 160. Although one or more cloud systems 110, communication systems 120a-120, single network 130, communication links 140-150, and communication space 160 are shown and described, embodiments contemplate any number of cloud systems 110, communication systems 120, networks 130, communication links 140-150, and/or communication space 160, according to particular needs.

In one embodiment, cloud system 110 comprises administrator 112 and database 114. Administrator 112 is programmed to generate communication space 160 in which one or more communication systems 120 may participate. Administrator 112 is also programmed to generate, at the request of one or more participating communication systems 120, one or more customizable chat spaces 162 within communication space 160, illustrated in FIG. 1 as chat spaces 162a-162n. Administrator 112 may make one or more chat spaces 162 available to other communication systems 120 participating in communication space 160. Database 114 comprises one or more databases 114 or other data storage arrangements at one or more locations local to, or remote from, cloud system 110. In one embodiment, one or more databases 114 is coupled with the one or more administrators 112 using one or more local area networks (LANs), metropolitan area networks (MANs), wide area networks (WANs), or aforementioned network 130, such as, for example, the Internet, or any other appropriate wire line, wireless link, or any other communication links 140-150. One or more databases 114 store data that is made available to and may be used by one or more administrators 112 according to the operation of communication network 100 described herein. According to embodiments, administrator 112 hosts and runs one or more runtime processes associated with cloud system 110.

According to embodiments, each of one or more communication systems 120 comprises one or more users such as, for example, an individual person or customer, one or more employees or teams of employees within a business, or any other individual, person, group of persons, business, or enterprise which communicates or otherwise interacts with one or more separate communication systems 120. Although an exemplary number of communication systems 120 are shown and described, embodiments contemplate any number of communication systems 120 interacting with network 130 and one or more cloud systems 110 according to particular needs.

Each of one or more communication systems 120 comprises one or more communication devices, such as, for example, cellular phones or smartphones, desktop computers, laptop computers, notebook computers, tablet-type devices, terminals, or any other communication device capable of receiving, transmitting, and displaying visual information through network 130. In an embodiment, each of the one or more communication devices may comprise an audiovisual recording device, such as a camera and microphone, and an audiovisual display device, such as an electronic display screen and one or more speakers. In addition, each of the one or more communication devices may comprise an input device, such as a keyboard, mouse, or touchscreen.

Each of the one or more communication devices may comprise a processor, memory and data storage. The processor may execute an operating system program stored in memory to control the overall operation of the one or more communication devices associated with each of one or more communication systems 120. For example, the processor may control the reception of signals and the transmission of signals within communication network 100. The processor may execute other processes and programs resident in memory, such as, for example, registration, identification or communication over communication links 140-150, and moving data into or out of the memory, as required by an executing process.

Each of the one or more communication devices that comprise each of one or more communication systems 120 may be coupled with other communication devices, as well as one or more cloud systems 110, by network 130 via one or more communication links 140-150. Although communication links 140-150 are shown connecting each of one or more communication systems 120, respectively, to network 130, embodiments contemplate any number of communication links 140-150 connecting any number of communication systems 120 with network 130, according to particular needs. In addition, or as an alternative, communication links 140-150 may connect one or more communication systems 120 directly to one or more cloud systems 110 and/or one or more separate communication systems 120 and/or communication devices.

According to embodiments, one or more communication links 140-150 couple one or more cloud systems 110, including administrator 112 and database 114, and one or more communication systems 120 with network 130 and communication space 160. Each communication link 140-150 may comprise any wireline, wireless, or other link suitable to support data communications between one or more cloud systems 110 and network 130. Although communication links 140-150 are shown as generally coupling one or more cloud systems 110 and one or more communication systems 120 with network 130, one or more cloud systems 110 and one or more communication systems 120 may communicate directly with each other according to particular needs.

According to embodiments, network 130 includes the Internet, telephone lines, any appropriate LANs, MANs, or WANs, and any other communication network 100 coupling one or more cloud systems 110 and one or more communication systems 120. For example, data may be maintained by one or more cloud systems 110 at one or more locations external to one or more cloud systems 110, and made available to one or more cloud systems 110 or one or more communication systems 120 using network 130, or in any other appropriate manner.

According to embodiments, one or more cloud systems 110 and/or one or more communication systems 120 may each operate on one or more computers that are integral to or separate from the hardware and/or software that supports communication network 100. In addition, or as an alternative, the one or more users may be associated with communication network 100 including one or more cloud systems 110 and/or one or more communication systems 120. These one or more users may include, for example, one or more computers programmed to generate communication space 160 and to generate chat spaces 162 within communication space 160 autonomously. As used herein, the computer, the term "computer," and "computer system" comprise an input device and an output device. The computer input device includes any suitable input device, such as a keypad, mouse, touch screen, microphone, or other device to input information. The computer output device comprises any suitable output device that may convey information associated with the operation of communication network 100, including digital or analog data, visual information, or audio information. Furthermore, the one or more computers include any suitable fixed or removable non-transitory computer-readable storage media, such as magnetic computer disks, CD-ROMs, or other suitable media to receive output from and provide input to communication network 100. The one or more computers also include one or more processors and associated memory to execute instructions and manipulate information according to the operation of communication network 100.

Embodiments contemplate one or more cloud systems 110 generating communication space 160. Each of the one or more communication devices may connect to one or more cloud systems 110 using network 130 and communication links 140-150, and may participate in communication space 160. Each of the one or more communication devices, and the one or more users associated with each of the one or more communication devices, may use communication space 160 to locate and join one or more chat spaces 162 within communication space. Having joined a particular chat space 162, communication system 120 may transmit text-based or image-based chat messages or transfer files to other communication systems 120 participating in chat space 162, and may invite other communication devices to join the particular chat space 162. Although FIG. 1 illustrates communication space 160 comprising an exemplary number of chat spaces 162a-162n, embodiments generate cloud system 110 generating any number of chat spaces 162 within one or more communication spaces 160, according to particular needs.

Figure 4:
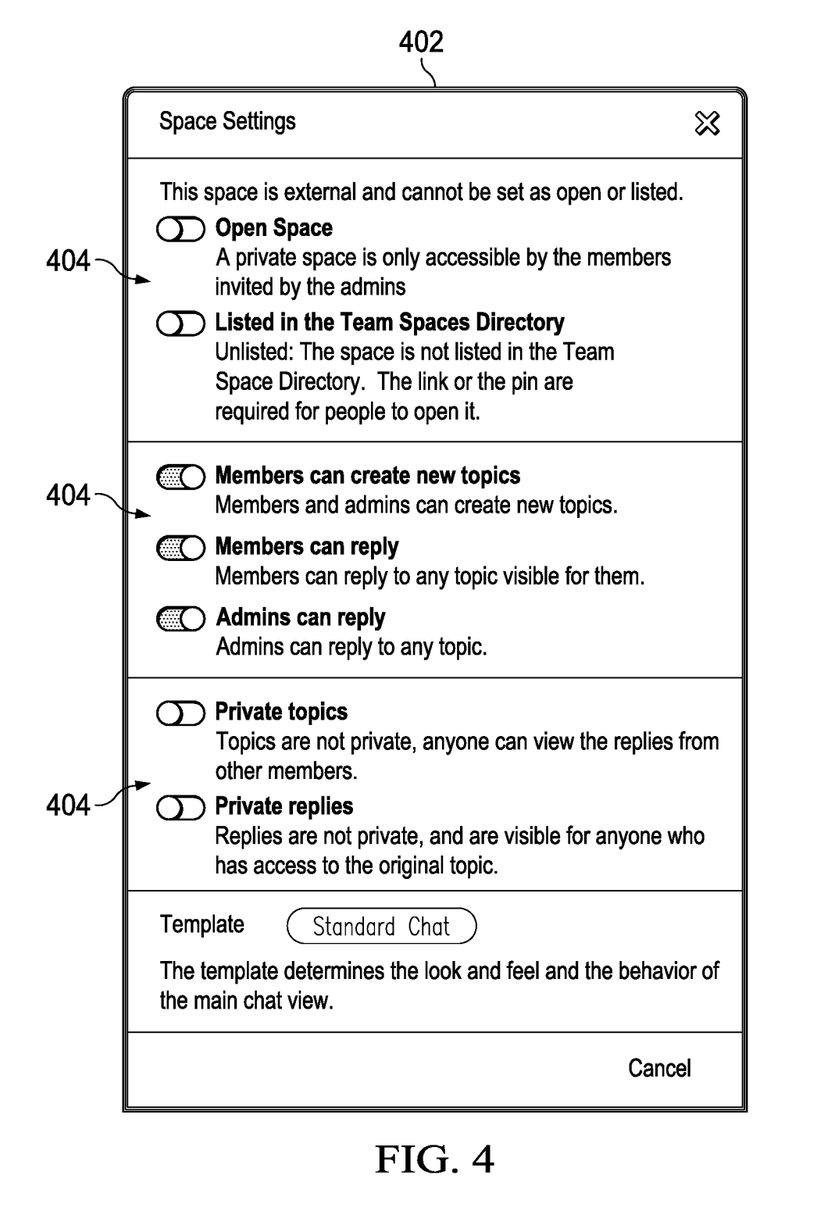
FIG. 4 illustrates an exemplary chat space creation interface, according to an embodiment.

In an embodiment, communication space 160 may include chat space creation interface 402, illustrated by FIG. 4. Cloud system 110 may generate chat space creation interface 402 and may transmit chat space creation interface 402 to a communication device. The communication device uses chat space creation interface 402 to create and customize the settings of new chat space 162. Cloud system 110 stores each created chat space 162 in chat space directory 214. Communication devices may customize each of one or more chat spaces 162 to incorporate different functionalities, including but not limited to, providing calendar or current weather functionality.

Figure 6:
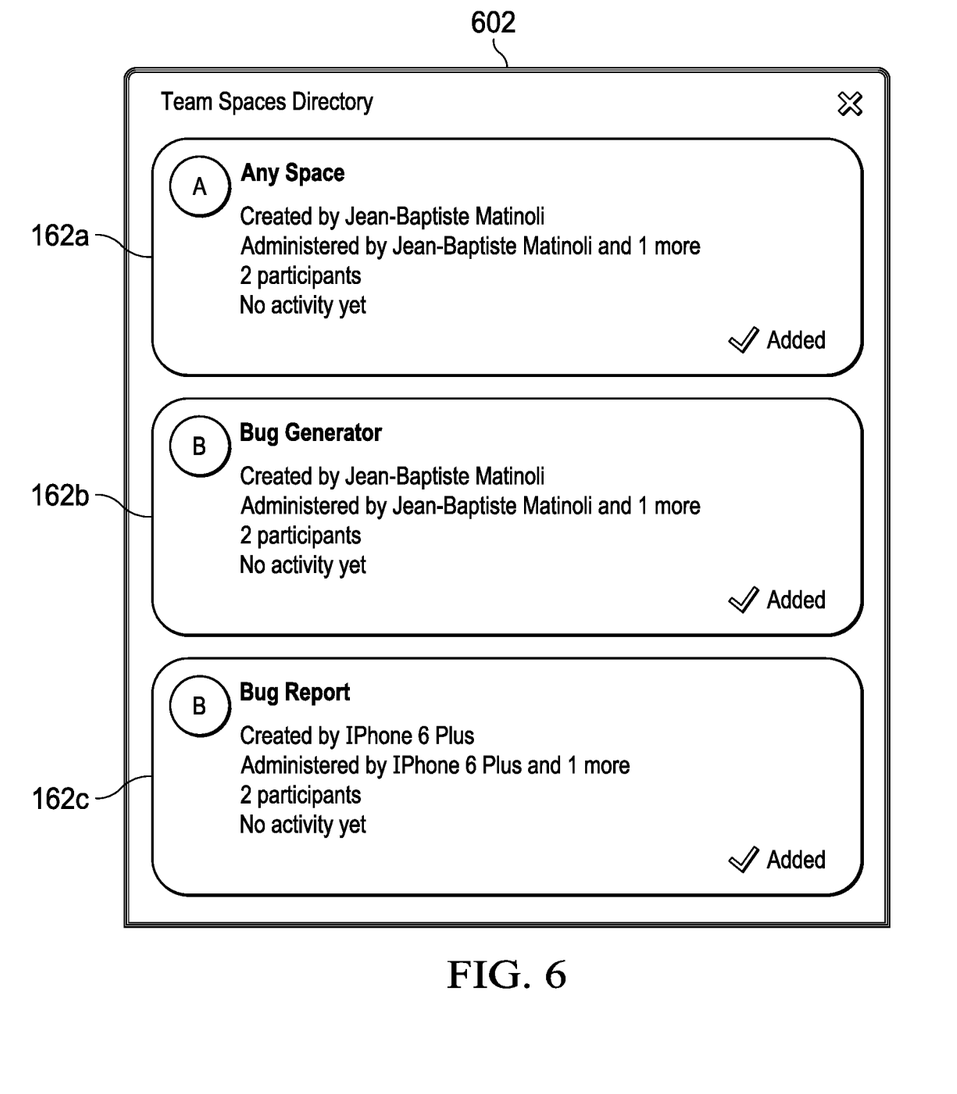
FIG. 6 illustrates an exemplary chat space selection interface, according to an embodiment.

In an embodiment, communication space 160 may also comprise chat space selection interface 602, illustrated by FIG. 6. Cloud system 110 may generate chat space selection interface 602 and may transmit chat space selection interface 602 to a communication device. The communication device uses chat space selection interface 602 to locate a particular chat space 162 in which the communication device will participate. Chat space selection interface 602 may comprise a search function. The communication device may use the search function to locate chat spaces 162 by keywords, subject matter, or other criteria.

Each chat space 162 may permit participating communication devices to exchange text-based or image-based chat messages, transfer files, or invite other communication devices to the particular chat space 162. As illustrated and described below, cloud system 110 generates chat space participation interface 702, illustrated by FIG. 7, and transmits chat space participation interface 702 to each of the one or more communication devices participating in chat space 162. Each communication device displays chat space participation interface 702 on an associated audiovisual display device. According to embodiments, chat space participation interface 702 displays chat messages, transferred files, and a list of the communication devices participating in the particular chat space 162, as well as additional customizable functionality depending on the particular parameters of chat space 162.

Figure 2:
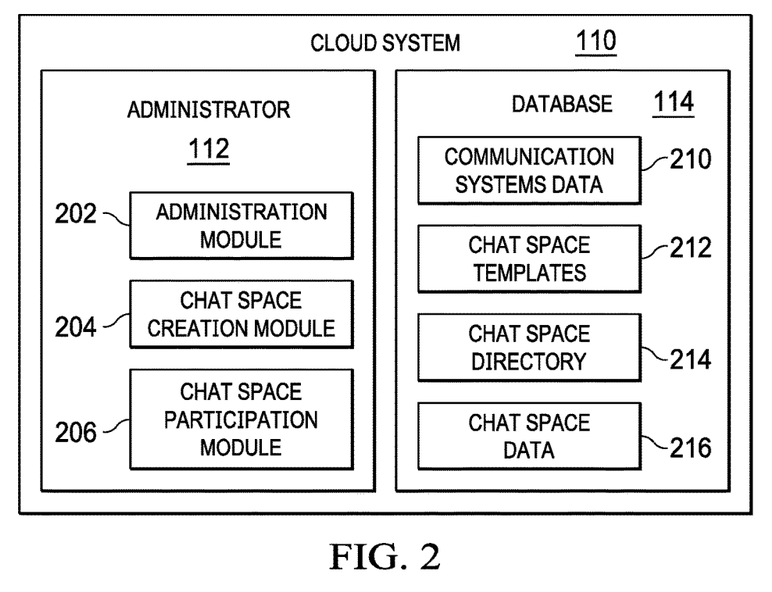
FIG. 2 illustrates the cloud system of FIG. 1 in greater detail, according to an embodiment.

FIG. 2 illustrates cloud system 110 of FIG. 1 in greater detail, according to an embodiment. In an embodiment, cloud system 110 may comprise one or more computers at one or more locations including associated input devices, output devices, non-transitory computer-readable storage media, processors, memory, or other components to send and receive information between one or more communication systems 120 and/or one or more communication devices according to the operation of communication network 100. In addition, cloud system 110 comprises administrator 112 and database 114. Although cloud system 110 is described as comprising single administrator 112 and database 114, embodiments contemplate any suitable number of administrators 112 or databases 114, internal to or externally coupled with cloud system 110. In addition, or as an alternative, cloud system 110 may be located internal to one or more communication systems 120. For example, in an embodiment in which one of communication systems 120 is a computer, the computer may also function as cloud system 110 and may generate communication space 160 for other participating communication systems 120. In other embodiments, cloud system 110 may be located external to one or more communication systems 120 and may be located in, for example, a corporate or regional entity of one or more communication systems 120, according to particular needs.

According to embodiments, administrator 112 comprises administration module 202, chat space creation module 204, and chat space participation module 206. Although a particular configuration of administrator 112 is shown and described, embodiments contemplate any suitable number or combination of administration modules 202, chat space creation modules 204, chat space participation modules 206, and/or other modules, located at one or more locations, local to, or remote from, cloud system 110, according to particular needs. In addition, or as an alternative, administration module 202, chat space creation module 204, and chat space participation module 206 may be located on multiple administrators 112 or computers at any location in communication network 100.

According to embodiments, database 114 comprises communication systems data 210, chat space templates 212, chat space directory 214, and chat space data 216. Although database 114 is shown and described as comprising communication systems data 210, chat space templates 212, chat space directory 214, and chat space data 216, embodiments contemplate any suitable number or combination of communication systems data 210, chat space templates 212, chat space 162 directories, chat space data 216, and/or other data pertaining to communication network 100 located at one or more locations, local to, or remote from, cloud system 110, according to particular needs.

Administration module 202 of administrator 112 may configure, update, and/or manage the operation of cloud system 110. That is, administration module 202 may configure, update, and/or manage the broader operation of communication network 100 and change which data is executed and/or stored on cloud system 110 and/or one or more communication devices. Communication network 100 may comprise a user-configurable system, such that cloud system 110 administrator 112 may store communication systems data 210, chat space templates 212, chat space directory 214, and/or chat space data 216 either singularly or redundantly in cloud system 110 database 114 and/or one or more communication devices, according to particular needs. According to other embodiments, administration module 202 monitors, processes, updates, creates, and stores communication systems data 210, chat space templates 212, chat space directory 214, and/or chat space data 216 in cloud system 110 database 114.

According to embodiments, administration module 202 may generate communication space 160, which one or more communication devices may join. When a communication device joins communication space 160, administration module 202 may record unique identifying information regarding the communication device, such as by assigning the communication device a unique ID or by recording the communication device's IP or MAC address, in communication systems data 210.

Communication systems data 210 of database 114 comprises the identification information of one or more communication systems 120 and the one or more communication devices associated with one or more communication systems 120. Communication systems data 210 may include, for example, names and addresses of the one or more users associated with each of one or more communication systems 120, company contact information, telephone numbers, email addresses, IP addresses, and the like. According to embodiments, identification information may also comprise information associated with the operating systems of each of one or more communication systems 120, internet browser information regarding each of the one or more communication devices associated with each of one or more communication systems 120, or system specifications (such as, for example, processor speed, available memory, hard drive space, and the like) for each of the one or more communication devices associated with each of one or more communication systems 120.

Communication systems data 210 may also include end user ID information, communication system 120 ID information, communication system 120 MAC address information, or any other type of information which cloud system 110 may use to identify and track each of one or more communication systems 120 participating in communication network 100. Communication systems data 210 may further comprise identification data which identifies and tracks each of the one or more communication devices which comprise each of one or more communication systems 120. Although particular communication systems data 210 are described, embodiments contemplate any type of communication systems data 210 associated with one or more communication systems 120 or communication devices, according to particular needs. In one embodiment, cloud system 110 uses communication systems data 210 to identify one or more participating communication systems 120 in communication network 100 in order to generate particular configurations of communication network 100 specific to each communication system 120.

In an embodiment, a communication device may transmit a request to create one or more chat spaces 162 to administration module 202 of administrator 112 using network 130 and communication links 140-150. Administration module 202 transmits the communication device's request to chat space creation module 204 of administrator 112. Chat space creation module 204 is responsible for generating new chat spaces 162 and for generating, and transmitting to communication devices, chat space creation interface 402 which permits the communication device to choose the settings of one or more new chat spaces 162.

Upon receiving a request from a communication device to generate a new chat space 162, chat space creation module 204 may access chat space templates 212 of database 114. Chat space templates 212 may store information regarding one or more default chat spaces 162 (such as, for example, a "Bug Report" chat space 162 template that permits a communication device to report a software bug and to transmit this report to one or more preselected separate communication devices). Chat space creation module 204 uses information stored in chat space templates 212 to generate chat space creation interface 402. Chat space creation module 204 transmits chat space creation interface 402, using network 130 and communication links 140-150, to the communication device that requested a new chat space 162. The communication device displays chat space creation interface 402 on its audiovisual display device, and chooses settings for the new chat space 162.

According to embodiments, a communication device may configure the settings for one or more new chat spaces 162 to create a one-to-any chat space 162 (in which the originating communication device can create one or more nested chat spaces 162 within new chat space 162 but no other participating communication devices may create nested chat spaces 162 within new chat space 162); an any-to-any chat space 162 (in which all participating communication devices can create one or more nested chat spaces 162 within new chat space 162 that are visible to all communication devices); an any-to-one chat space 162 (in which all communication devices can create one or more private nested chat spaces 162 that are visible only to (1) communication devices invited to participate in the private nested chat spaces 162 and (2) the originating communication device that initially created the new chat space 162 in which the private nested chat spaces 162 reside); and/or a one-to-one chat space 162 (in which all communication devices can create one or more private nested chat spaces 162 that are visible only to communication devices invited to participate in the private nested chat spaces 162, potentially excluding the originating communication device that initially created the new chat space 162 if the originating communication device is not invited to the private nested chat space 162). The communication device transmits these settings selections to chat space creation module 204. Chat space creation module 204 generates new chat space 162 according to the settings selections, and stores the new chat space 162 in chat space directory 214.

Chat space directory 214 of database 114 stores information regarding current chat spaces 162 available within communication space 160. Embodiments contemplate chat space directory 214 storing information regarding any number of stored and/or currently-operating chat spaces 162, wherein each chat space 162 comprises a unique selection of participating communication devices.

Chat space participation module 206 of administrator 112 mediates the transmission of chat messages, files, and other information between communication devices participating in one or more chat spaces 162, as well as communication devices searching for and joining one or more chat spaces 162. According to embodiments, a communication device may transmit to administration module 202, using network 130 and communication links 140-150, a request to view chat spaces 162 stored in chat space directory 214. Administration module 202 may transmit the communication device's request to chat space participation module 206.

Chat space participation module 206 may access information stored in chat space directory 214, and may generate chat space selection interface 602, which chat space participation module 206 transmits to the communication device using network 130 and communication links 140-150. According to embodiments, chat space selection interface 602 may display current chat spaces 162 which exist within communication space 160, and may also display a search function, allowing the communication device to search for chat spaces 162 by keywords, subject matter, or other criteria. The communication device may display chat space selection interface 602 using its audiovisual display device.

Figure 7:
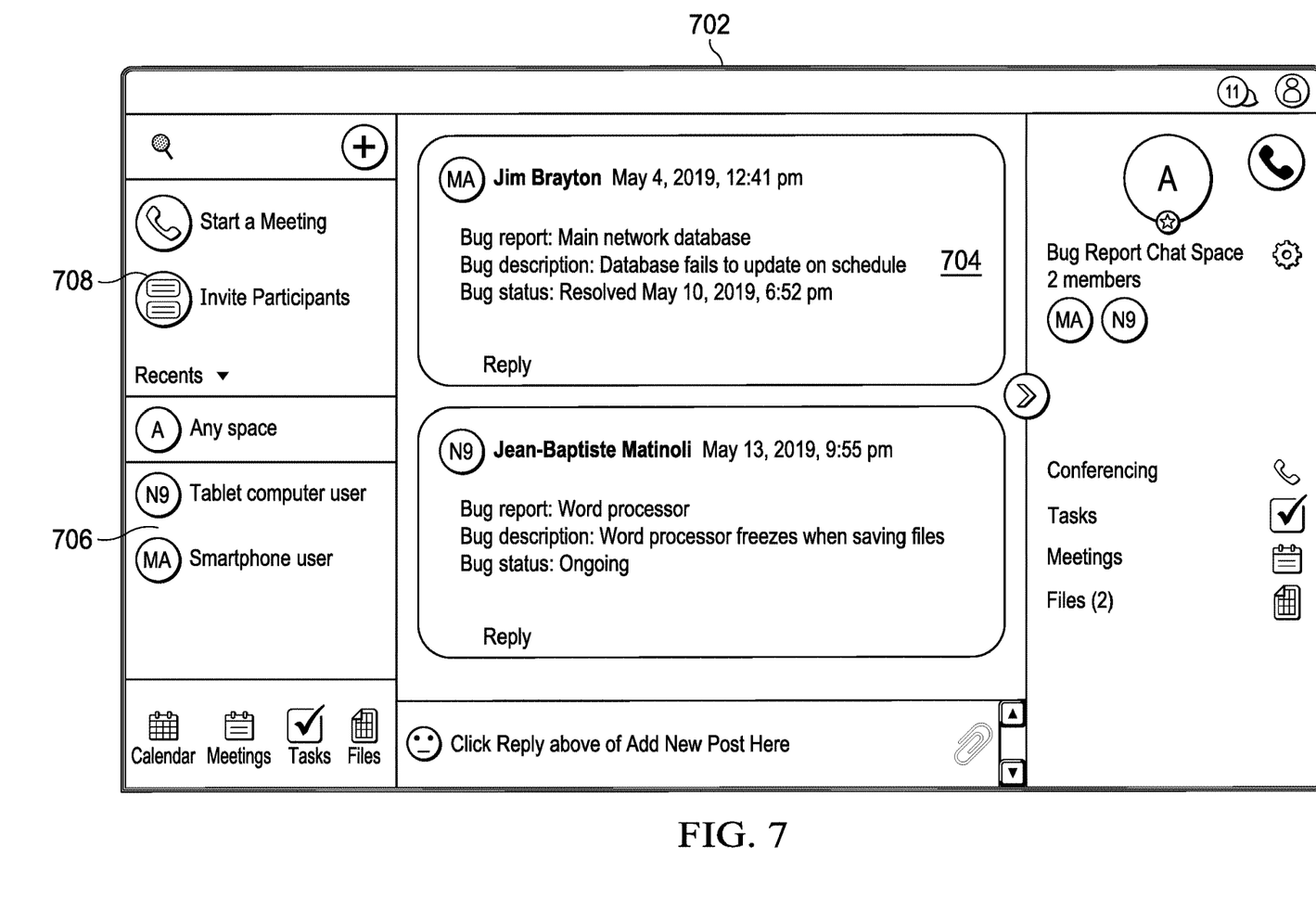
FIG. 7 illustrates an exemplary chat space participation interface, according to an embodiment.

The communication device may use chat space selection interface 602 to select a particular chat space 162 to join. The communication device transmits a request to join the particular chat space 162 to chat space participation module 206 using network 130 and communication links 140-150. Chat space participation module 206 generates chat space participation interface 702 and transmits chat space participation interface 702 to the communication device. The communication device displays chat space participation interface 702 to communication system 120 device.

Communication devices participating in chat space 162 may exchange text-based or image-based chat messages with one another, transfer files, and/or invite other communication devices to the particular chat space 162. Each communication device participating in a particular chat space 162 may transmit chat messages or files to chat space participation module 206 using network 130 and communication links 140-150. Chat space participation module 206 may store each chat message or file in chat space data 216 of database 114.

Chat space data 216 of database 114 may comprise information, including text messages, images, files, links, emojis, and the like (collectively, a "chat message"), transmitted between communication devices participating in a particular chat space 162. Chat space data 216 may associate chat messages, files, and other information shared within each of one or more chat spaces 162 with that particular chat space 162, and may store chat messages, files, and other information associated with each particular chat space 162 in chat space data 216. Cloud system 110 may store a transcript of the chat messages transmitted between communication devices within each particular chat space 162 in one or more databases 114 associated with communication network 100. One or more cloud systems 110 and/or one or more communication devices may access the one or more transcripts at a later time.

Figure 3:
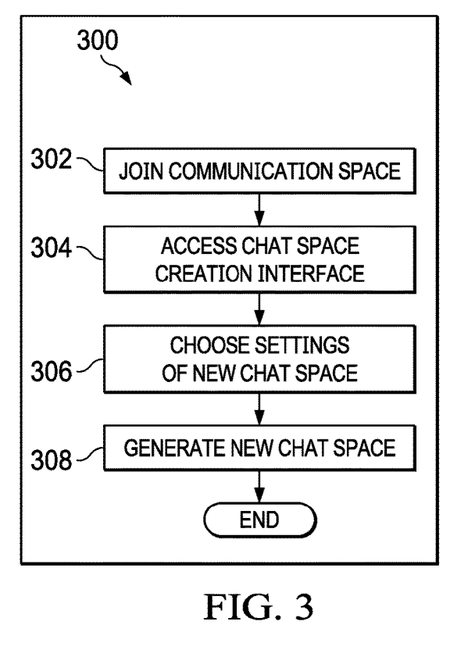
FIG. 3 illustrates an exemplary method of generating one or more chat spaces, according to an embodiment.

FIG. 3 illustrates exemplary method 300 of generating one or more chat spaces 162, according to an embodiment. Method 300 of generating one or more chat spaces 162 proceeds by one or more actions, which although described in a particular order may be performed in one or more permutations or alternative orders, according to particular needs.

In an embodiment, at action 302 of method 300, administration module generates communication space 160, and one or more communication devices join communication space 160. At action 304, one or more communication devices in communication space 160 access chat space creation interface 402 to generate one or more new chat spaces 162. At action 306, the one or more communication devices use chat space creation interface 402 to choose the settings of one or more new chat spaces 162. At action 308, chat space creation module 204 generates one or more new chat spaces according to the settings selected by the one or more communication devices. Communication network 100 terminates method 300.

In order to illustrate the operation of communication network 100 executing the actions of method 300 to generate one or more chat spaces 162, the following example is provided. In this example, communication network 100 comprises cloud system 110, communication system 120 communication device comprising a computer with an audiovisual display device, network 130, and communication links 140-150 connecting cloud system 110 and the computer to network 130 and to communication space 160. Although a particular number of cloud systems 110, communication devices, networks 130, communication links 140-150, and communication spaces 160 are described herein, embodiments contemplate any number of cloud systems 110, communication devices, networks 130, communication links 140-150, and/or communication spaces, according to particular needs.

At action 302 of method 300, administration module 202 generates communication space 160 and transmits, using network 130, a request to join communication space 160 to the computer. The computer accepts the request and transmits its acceptance of the request to administration module 202 using network 130 and communication links 140-150. Administration module 202 records unique identifying information regarding the computer, such as by assigning the computer a unique ID and by recording the computer's IP or MAC address, in communication systems data 210.

Continuing the example of method 300, at action 304, the computer accesses chat space creation interface 402. The computer initiates this action by transmitting a request to create chat space 162 to administration module 202 using network 130 and communication links 140-150. Administration module 202 transmits the computer's request to chat space creation module 204. Chat space creation module 204 accesses chat space templates 212 of database 114, and uses information pertaining to one or more available chat space templates 212 to generate chat space creation interface 402. Chat space creation module 204 transmits chat space creation interface 402 to the computer. The computer displays chat space creation interface 402 on its audiovisual display device.

FIG. 4 illustrates exemplary chat space creation interface 402, according to an embodiment. Chat space creation interface 402 displays chat space creation settings 404 which determine the parameters by which new chat space 162 will operate. Communication devices may use chat space creation interface 402 to create chat spaces 162 accessible to specific communication devices, or which pertain to specific topics or keywords (such as a "bug report"), according to selected chat space creation settings 404. Although particular examples of chat space creation interface 402 and chat space creation settings 404 are illustrated in FIG. 4, embodiments contemplate communication devices choosing any manner of settings for a new chat space 162 using chat space creation interface 402 and chat space creation settings 404, according to particular needs.

According to embodiments, a communication device may use chat space creation interface 402 to configure chat space creation settings 404 for a variety of unique chat spaces 162. Possible chat spaces 162 configured by particular chat space creation interface 402 chat space creation settings 404 may include, for example, an announcement chat space 162, wherein a communication device can post a message but no other communication devices can respond to the message; or an idea box chat space 162, wherein any communication device can submit an anonymous message and only a specified communication device, functioning as an idea box administrator 112, can view each message. Embodiments also contemplate a support center chat space 162, wherein communication devices can transmit separate chat messages regarding a plurality of topics, and one or more administrator 112 communication devices can reply to the chat messages and create ongoing chat message dialogues with the originating communication devices. To provide an additional non-limiting example, a communication device may create knowledge base chat space 162, to which communication devices can upload documents. In an embodiment, communication devices may access knowledge base chat space 162, download the documents hosted therein, and post visible or anonymous chat message comments regarding the documents. Although particular examples of chat spaces 162 and chat space creation settings 404 are described herein, embodiments contemplate communication devices utilizing chat space creation interface 402 to specify any chat space creation settings 404 for any configuration of chat spaces 162, according to particular needs.

Continuing the example of method 300, at action 306, the computer uses chat space creation interface 402 to configure chat space creation settings 404 of new chat space 162. In this example, the computer uses chat space creation interface 402 to title the new chat space 162 "Bug Report," and configures "Bug Report" chat space 162 not to have any additional functionalities, such as calendar or real-time weather functionality. The computer transmits the selected chat space creation settings 404 to chat space creation module 204.

Concluding the example of method 300, at action 308, chat space creation module 204 generates new "Bug Report" chat space 162 according to the computer's chosen chat space creation settings 404. Chat space creation module 204 generates a new chat space 162 titled "Bug Report," and stores "Bug Report" chat space 162 and associated settings in chat space directory 214. Communication network 100 terminates method 300.

Figure 5:
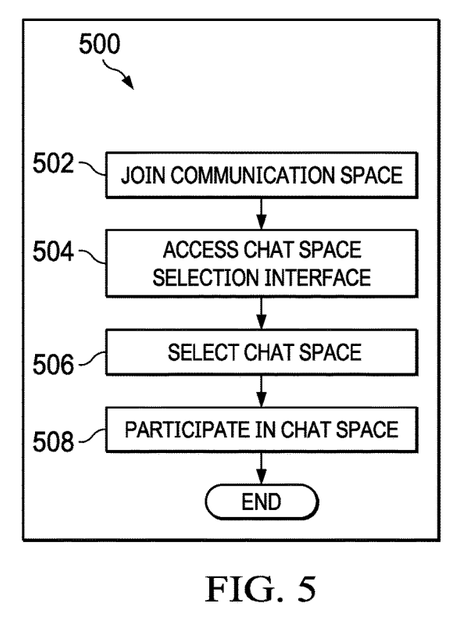
FIG. 5 illustrates an exemplary method of participating in a chat space, according to an embodiment.

FIG. 5 illustrates exemplary method 500 of participating in chat space 162, according to an embodiment. Method 500 of participating in chat space 162 proceeds by one or more actions, which although described in a particular order may be performed in one or more permutations or alternative orders, according to particular needs.

In an embodiment, action 502 comprises one or more communication devices joining communication space 160. Action 504 comprises one or more communication devices accessing chat space selection interface 602 to view one or more chat spaces 162 to join. Action 506 comprises one or more communication devices selecting one or more chat spaces 162 to join. Action 508 comprises one or more communication devices participating in one or more selected chat spaces 162. Communication network 100 then terminates method 500.

In order to illustrate communication network 100 executing the actions of method 500 to participate in one or more chat spaces 162, the following example is provided. In this example, communication network 100 comprises cloud system 110, a communication device comprising a smartphone with an audiovisual display device, network 130, communication space 160 comprising a plurality of chat spaces 162, and communication links 140-150 connecting cloud system 110 and the smartphone to network 130 and communication space 160. Although a particular configuration of cloud systems 110, communication devices, networks 130, communication spaces 160, and communication links 140-150 are described herein, embodiments contemplate any number of cloud systems 110, communication devices, networks 130, communication spaces 160, and/or communication links 140-150, according to particular needs.

Continuing the example of method 500, at action 502, administration module 202 generates communication space 160 and transmits, using network 130, a requests to join communication space 160 to the smartphone. The smartphone accepts the request and transmits its acceptance of the request to administration module 202 using network 130 and communication links 140-150. As discussed above, administration module 202 records unique identifying information regarding the smartphone, such as by assigning the smartphone a unique ID and by recording the smartphone's IP or MAC address, in communication systems data 210.

Continuing the example of method 500, at action 504, the smartphone accesses chat space selection interface 602. The smartphone initiates this action by transmitting a request to view chat spaces 162 which currently comprise communication space 160 to administration module 202 using network 130 and communication links 140-150. Administration module 202 transmits the smartphone's request to chat space 162 selection module. Chat space 162 selection module accesses chat space directory 214, and uses information pertaining to one or more chat spaces 162 stored in chat space directory 214 to generate chat space selection interface 602. Chat space 162 selection module transmits chat space selection interface 602 to the smartphone. The smartphone displays chat space selection interface 602 on its audiovisual display device.

FIG. 6 illustrates exemplary chat space selection interface 602, according to an embodiment. Chat space selection interface 602 displays a list of chat spaces 162 (in this example, "Any Space" chat space 162*a*, "Bug Generator" chat space 162*b*, and "Bug Report" chat space 162*c*") that comprise communication space 160, and which a particular communication device may choose to join. According to embodiments, chat space selection interface 602 displays additional information about each available chat space 162, such as, for example, the identity of the communication device or user who created each chat space 162, the number of communication devices which have participated in each chat space 162 by transmitting chat messages, or any other information. Although not illustrated in FIG. 6, chat space selection interface 602 may also comprise a search function. A communication device may use the search function to search for particular chat spaces 162 by title, associated keywords, or other criteria.

Continuing the example of method 500, at action 506, the smartphone selects "Bug Report" chat space 162*b*. The smartphone transmits this selection to chat space participation module 206 using network 130 and communication links 140-150. Chat space participation module 206 generates chat space participation interface 702 for "Bug Report" chat space 162*b*, and transmits "Bug Report" chat space 162*b* participation interface 702 to the smartphone. The smartphone displays "Bug Report" chat space 162*b* participation interface 702 using its audiovisual display device.

FIG. 7 illustrates exemplary chat space participation interface 702, according to an embodiment. According to embodiments, chat space participation interface 702 displays chat column 704 displaying chat messages exchanged between the communication devices participating in chat space 162, participant panel 706 listing the communication devices participating in chat space 162, and "Invite Participants" button 708. Although FIG. 7 illustrates chat column 704 and participant panel 706 in a particular configuration, embodiments contemplate chat space participation interfaces 702 of various configurations, including and excluding chat columns 704, participant panels 706, "Invite Participants" buttons 708, and/or other features, according to particular needs.

According to embodiments, chat column 704 occupies the majority of the center of chat space participation interface 702. Although chat column 704 is shown and described as occupying the center portion of chat space participation interface 702, embodiments contemplate chat space participation interface 702 displaying chat column 704 in any configuration, according to embodiments. Chat column 704 displays chat messages which the communication devices participating in chat space 162 have transmitted to chat space participation module 206 using network 130. According to embodiments, the communication devices may choose to send chat messages to every other communication device displayed in chat space participation interface 702; alternatively, communication devices may pre-select one or more specific communication device recipients before sending chat messages. Chat space participation module 206 may store each chat message in chat space data 216 of database 114.

According to embodiments, participant panel 706 on the left side of chat space participation interface 702 of FIG. 7 displays a visual representation of the communication devices currently participating in chat space 162. Although participant panel 706 is shown and described as occupying the left side of chat space participation interface 702, embodiments contemplate chat space participation interface 702 displaying participant panel 706 in any configuration, according to particular needs. Chat space participation interface 702 may identify participating communication devices by the names of the users associated with the communication devices (such as "Jane Doe"), or by identifying the communication devices themselves (such as "Tablet Computer," "Smartphone," and the like). In an embodiment, administration module 202 may assign names to the separate communication devices displayed in participant panel 706 using information contained in communication systems data 210. Chat space participation interface 702 may display the names of the communication devices participating in chat space 162 under, or in association with, each individual chat message displayed in chat space participation interface 702.

In an embodiment, participant panel 706 may include "Invite Participants" button 708. A communication device may use "Invite Participants" button 708 to transmit a request, using network 130 and communication links 140-150, to chat space participation module 206 to invite one or more separate communication devices to the particular chat space 162. Chat space participation module 206 may receive this request, and may transmit an invitation to join the particular chat space 162 to the one or more separate communication devices using network 130 and communication links 140-150. The one or more separate communication devices may accept this invitation and join chat space 162 according to the actions previously described above.

Continuing the example of method 500, at action 508, the smartphone participates in "Bug Report" chat space 162b. The smartphone transmits a chat message to chat space participation module 206. Chat space participation module 206 stores the chat message in chat space data 216 of database 114, and then generates updated chat space participation interface 702 displaying the most-recently-transmitted chat message in chat column 704. Chat space participation module 206 transmits updated chat space participation interface 702 to the smartphone. The smartphone displays the updated chat space participation interface using its audiovisual display device. Concluding the example, communication network 100 subsequently terminates method 500.

Embodiments contemplate chat spaces 162 incorporating additional customizable functionalities. For example, in an embodiment, a particular chat space 162 (in this example, titled "Weather Space") may comprise a real-time weather functionality. The real-time weather functionality may enable communication devices participating in Weather Space to view a report of current local weather conditions on the Weather Space chat space participation interface (not illustrated).

Continuing with the Weather Space example, a communication device, at action 306 of method 300, may select real-time weather functionality as a customizable setting. Chat space creation module 204, at action 308 of method 300, may generate the Weather Space chat space 162 and store the Weather Space chat space 162 and associated settings in chat space directory 214. One or more communication devices may then select the Weather Space chat space 162 in which to participate, according to the actions of method 500. At action 506 of method 500, chat space participation module 206 generates Weather Space chat space participation interface that displays a real-time report of current local weather conditions in addition to a chat column and participant panel.

Embodiments contemplate chat spaces 162 featuring any customizable function, according to particular needs. By way of non-limiting example, chat spaces 162 may comprise a calendar function (which displays the current day of the week and any upcoming appointments for a particular communication system 120), a calculator function (which allows communication devices to perform mathematical operations), and a stock market function (which displays current market information regarding the Dow Jones Industrial Average index, the S&P 500 index, or any other financial information). Embodiments contemplate chat spaces 162 incorporating any form of rich site summary (RSS) information feeds from any information source, or any form of internal company data, such as, for example, lists of employees, corporate metrics, sales metrics, ongoing customer satisfaction metrics, customer satisfaction surveys, or employee gamification objectives. Although particular chat space 162 examples are illustrated and described herein, embodiments contemplate chat spaces 162 comprising any information and content, according to particular needs.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
   two or more communication devices; and
   a computer coupled with a database and comprising a processor and memory, the computer configured to generate a customizable communication space comprising one or more customized chat spaces in which the two or more communication devices participate by:
generating a customizable communication space;
transmitting requests to join the customizable communication space to the two or more communication devices;
storing in the computer memory identification information for each of the two or more communication devices;
configuring, in response to instructions transmitted by one of the two or more communication devices, a customized chat space;
transmitting the customized chat space to the two or more communication devices; and
storing in the computer memory communications transmitted by the communication devices within the customized chat space.

2. The system of claim 1, further comprising one of the two or more communication devices accessing a chat space creation interface to configure a customized chat space.

3. The system of claim 2, further comprising one of the two or more communication devices configuring a customized chat space using one or more chat space creation templates stored in the computer memory.

4. The system of claim 3, wherein each of the one or more chat space creation templates comprises a chat space creation template selected from the list of:
a bug report chat space creation template;
a weather report chat space creation template;
a calendar function chat space creation template;
a stock market index tracker chat space creation template; and
a calculator function chat space creation template.

5. The system of claim 4, further comprising the two or more communication devices accessing a chat space selection interface to select one or more customized chat spaces in which to transmit communications.

6. The system of claim 1, wherein each of the two or more communication devices comprises a communication device selected from the list of:
a computer;
a tablet computer; and
a smartphone.

7. The system of claim 1, wherein each of the communications transmitted by the communication device within the customized chat space comprises a communication selected from the list of:
a text message;
a video file;
an audio file; and
a hypertext link.

8. A computer-implemented method, comprising:
generating, using a computer coupled with a database and comprising a processor and memory, a customizable communication space comprising one or more customized chat spaces in which two or more communication devices participate;
transmitting requests to join the customizable communication space to the two or more communication devices;
storing in the computer memory identification information for each of the two or more communication devices;
configuring, in response to instructions transmitted by one of the two or more communication devices, a customized chat space;
transmitting the customized chat space to the two or more communication devices; and
storing in the computer memory communications transmitted by the communication devices within the customized chat space.

9. The computer-implemented method of claim 8, further comprising:
accessing, with one of the two or more communication devices, a chat space creation interface to configure a customized chat space.

10. The computer-implemented method of claim 9, further comprising:
configuring, with one of the two or more communication devices, a customized chat space using one or more chat space creation templates stored in the computer memory.

11. The computer-implemented method of claim 10, wherein each of the one or more chat space creation templates comprises a chat space creation template selected from the list of:
a bug report chat space creation template;
a weather report chat space creation template;
a calendar function chat space creation template;
a stock market index tracker chat space creation template; and
a calculator function chat space creation template.

12. The computer-implemented method of claim 11, further comprising the two or more communication devices accessing a chat space selection interface to select one or more customized chat spaces in which to transmit communications.

13. The computer-implemented method of claim 8, wherein each of the two or more communication devices comprises a communication device selected from the list of:
a computer;
a tablet computer; and
a smartphone.

14. The computer-implemented method of claim 8, wherein each of the communications transmitted by the communication device within the customized chat space comprises a communication selected from the list of:
a text message;
a video file;
an audio file; and
a hypertext link.

15. A non-transitory computer-readable storage medium embodied with software, the software when executed configured to:
generate, using a computer coupled with a database and comprising a processor and memory, a customizable communication space comprising one or more customized chat spaces in which two or more communication devices participate;
transmit requests to join the customizable communication space to the two or more communication devices;
store in the computer memory identification information for each of the two or more communication devices;
configure, in response to instructions transmitted by one of the two or more communication devices, a customized chat space;
transmit the customized chat space to the two or more communication devices; and
store in the computer memory communications transmitted by the communication devices within the customized chat space.

16. The non-transitory computer-readable storage medium of claim 15, wherein the software when executed is further configured to:
   access a chat space creation interface to configure a customized chat space.

17. The non-transitory computer-readable storage medium of claim 16, wherein the software when executed is further configured to:
   configure a customized chat space using one or more chat space creation templates stored in the computer memory.

18. The non-transitory computer-readable storage medium of claim 17, wherein each of the one or more chat space creation templates comprises a chat space creation template selected from the list of:
   a bug report chat space creation template;
   a weather report chat space creation template;
   a calendar function chat space creation template;
   a stock market index tracker chat space creation template; and
   a calculator function chat space creation template.

19. The non-transitory computer-readable storage medium of claim 18, wherein the software when executed is further configured to:
   access a chat space selection interface to select one or more customized chat spaces in which to transmit communications.

20. The non-transitory computer-readable storage medium of claim 15, wherein each of the two or more communication devices comprises a communication device selected from the list of:
   a computer;
   a tablet computer; and
   a smartphone.

* * * * *